April 25, 1967          C. I. BOHLEN          3,315,759

TRACTOR WITH MEANS TO EFFECT ZERO TURNING RADIUS

Filed Dec. 16, 1964          4 Sheets-Sheet 1

INVENTOR.
CHARLES I. BOHLEN
BY Millman and Jacobs
ATTORNEYS

INVENTOR.
CHARLES I. BOHLEN
BY
ATTORNEYS

April 25, 1967 C. I. BOHLEN 3,315,759
TRACTOR WITH MEANS TO EFFECT ZERO TURNING RADIUS
Filed Dec. 16, 1964 4 Sheets-Sheet 3

INVENTOR.
CHARLES I. BOHLEN
BY
ATTORNEYS

United States Patent Office 3,315,759
Patented Apr. 25, 1967

3,315,759
TRACTOR WITH MEANS TO EFFECT
ZERO TURNING RADIUS
Charles I. Bohlen, Doylestown, Pa., assignor to Strick
Corporation, Fairless Hills, Pa., a corporation of
Pennsylvania
Filed Dec. 16, 1964, Ser. No. 418,630
9 Claims. (Cl. 180—79.2)

This invention relates to vehicles, such as trucks, tractor-trailers, passenger cars, buses, and the like, and more particularly to the tractor-trailer.

At present, tractor-trailers operate satisfactorily over highways and turnpikes, around traffic circles and most city driving. To shorten the turning radius of the tractor-trailer combination, the trend today is toward shorter tractor wheel bases since the effective overall turning radius of the combination is a function of the tractor wheel base. However, there are still many occasions in which the operation of the modern tractor-trailer leaves much to be desired, as in executing turns in congested areas, backing up to loading platforms, spotting trailers in marshalling yards where repeated backing up, pulling and other maneuvers are required, and the like.

It is the primary object of this invention to provide a tractor with an easily operable means to effect a zero turning radius thereby increasing the maneuverability of the tractor-trailer combination and overcoming the disadvantages noted above.

Another object of the invention is to provide a tractor with a means to effect a zero turning radius which is operable independently of and does not require substantial alteration nor does it interfere with the conventional steering mechanism of the tractor so that both conventional and zero turning radius operations are provided in the tractor which can be effected selectively.

Another object of the invention is to provide a tractor with means to move the front wheels in non-parallel positions divergently outwardly of the chassis and means to rotate the rear wheels in opposite directions to each other to thereby effect a zero turning radius about the intersection of the longitudinal axis of the tractor and that of the rear axle as the center.

Another object of the invention is to provide a tractor of the character described in which several different easily operable means may be employed to cause the rear wheels to turn in opposite directions relative to each other after the front wheels have been turned to their extreme divergent outward positions.

In U.S. Patent No. 3,112,040, a freight handling system is disclosed employing a complex and expensive tractor capable of effecting a zero turning radius so that the front of the trailer body can be pushed towards the railroad car for ultimate transfer thereto while the rear is supported upon the railroad car for rotation about a vertical axis. It is another object of this invention to provide a tractor for use in the system of said patent which is simpler, easier to operate and less expensive than the tractor shown and described in the patent.

These and other objects of the invention will become more apparent as the following description proceeds in conjunction with the accompanying drawings, wherein.

Specific reference is now made to the drawings in which similar reference characters are used for corresponding elements throughout.

Figure 1:
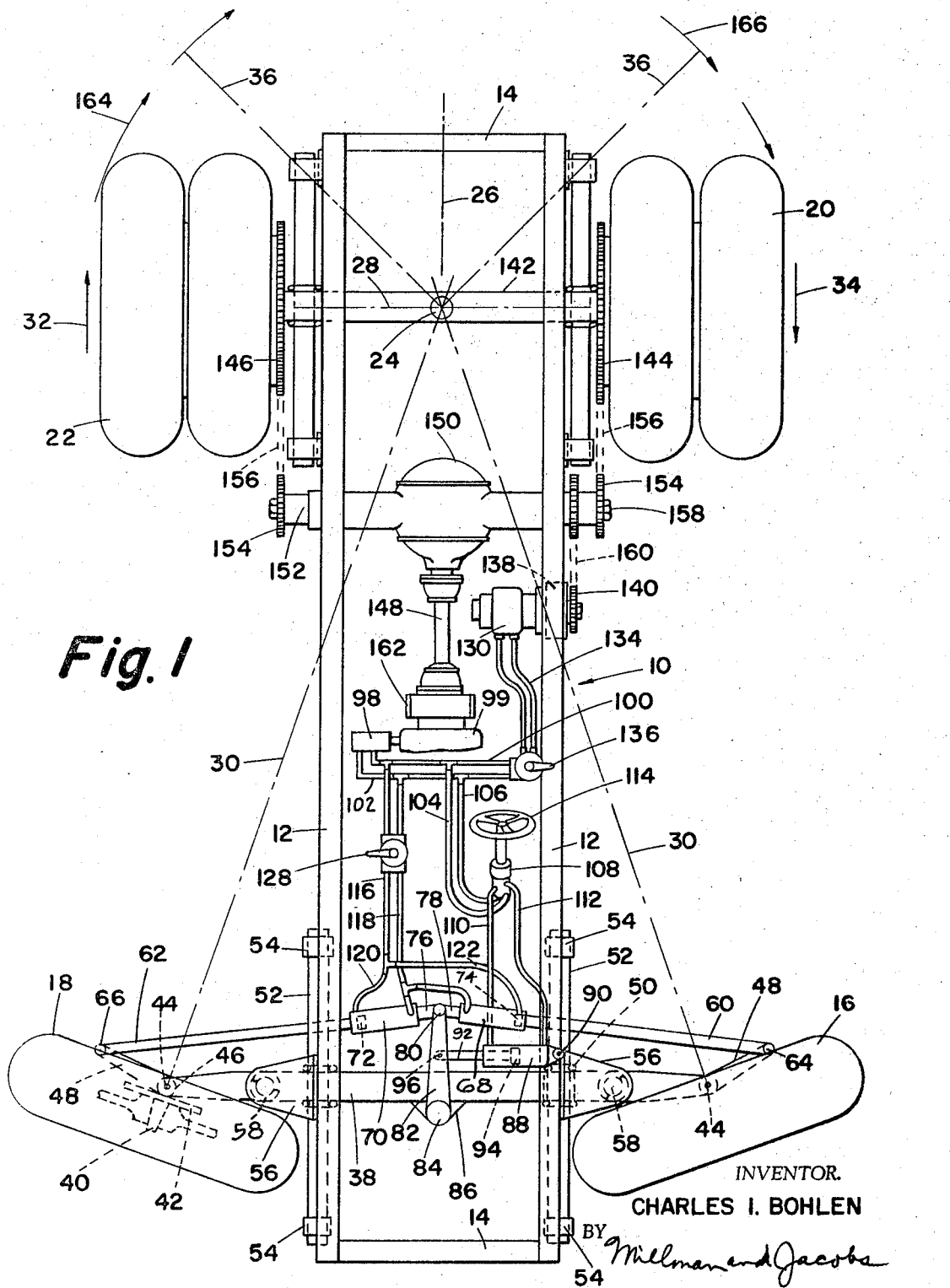
FIG. 1 is a top plan view of a tractor constructed in accordance with the instant invention and illustrating the position of the front wheels when effecting a zero turning radius.

The towing vehicle or tractor of the instant invention is shown generally at 10 and includes a chassis having transversely spaced longitudinal beams 12 connected by longitudinally spaced cross members 14, the chassis serving to support the front and rear wheels 16, 18 and 20, 22, the drive and transmission means therefor, a cab (not shown) at its front end and a conventional fifth wheel (not shown) at its rear end.

By definition the turning radius of a vehicle is the distance from the turning center to the center of tire contact with the road of the wheel describing the largest circle while the vehicle is executing its sharpest practical turn. When one end of the vehicle can rotate about a center of the vehicle in such a manner that the vehicle itself as such does not move in a circle, the vehicle is said to have a zero turning radius. It has been found to provide a zero turning radius about a center 24 which is the point of intersection of the longitudinal axis 26 and the transverse axis of rotation 28 of the rear wheels, not only must a means be provided to position the front wheels 16 and 18 divergently outwardly of the chassis, see FIG. 1, so that the centers thereof are equidistant as at 30 from center of rotation 24, but to move the divergent front wheels in a common circle about the point 24 while maintaining a zero turning radius requires a means to cause the rear wheels 20 and 22 to rotate in opposite directions, as shown by the arrows 32 and 34 so that the rear wheels will themselves move in a common circle at a radius 36 from the point 24.

Since the three modifications shown differ only with respect to the means to drive the rear wheels 20 and 22 in opposite directions, and not with respect to the means mounting the front wheels on the chassis to effect normal steering as well as zero radius rotation, the latter will first be described. The front wheels 16 and 18 are pivoted around vertical axes to the ends of a front axle 38 in any one of a number of methods well known in the automotive art. Thus, for example, the wheel is secured to a tapered spindle 40 which is in turn secured to a backing plate 42 having lugs which rotatably receive the vertically extending kingpin 44, the end of the axle having a sleeve 46 which journals the kingpin. One of the lugs of the backing plate has an integral link 48 to the end of which a conventional transversely extending steering rod is normally pivoted around a vertical axis whereby crosswise movement of the rod will cause the backing plate 42, the spindle 40 and the attached wheel 16, 18 to rotate about the vertical axis of the kingpin 44.

Figure 2:
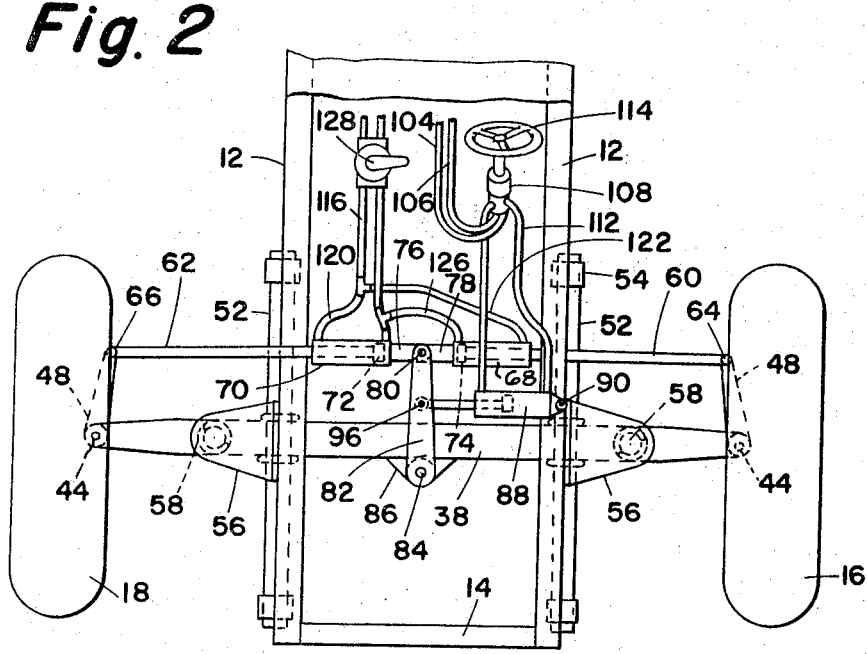
FIG. 2 is a top plan view of the front end of the tractor showing the straight position of the front wheels, the pre-condition required to turn the front wheels to the divergent position shown in FIG. 1.
Figure 3:
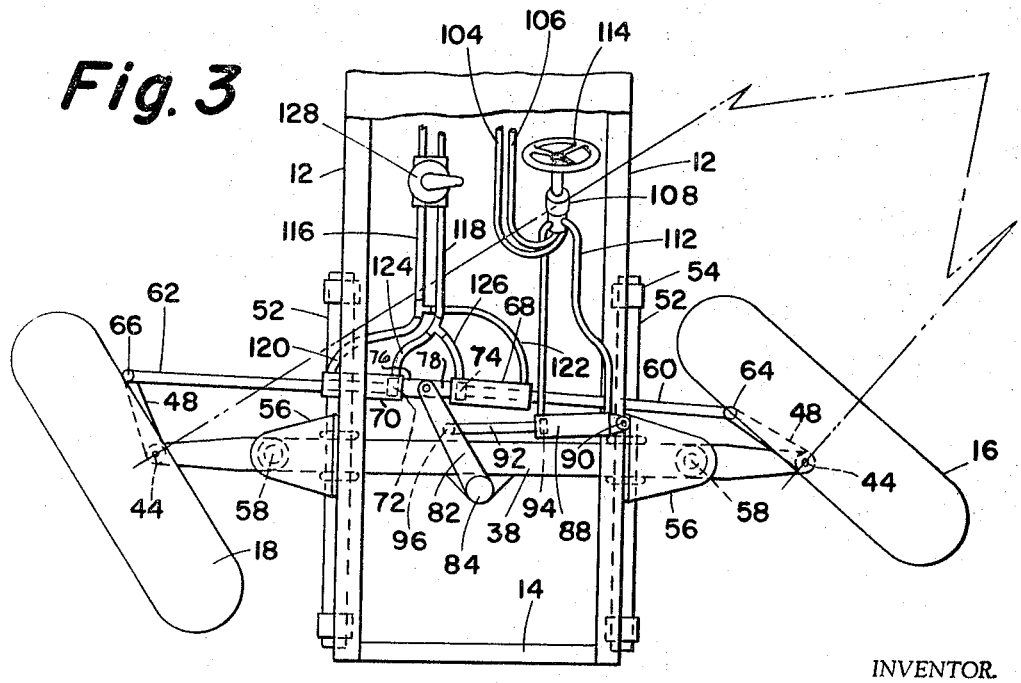
FIG. 3 is a top plan view of the front end of the tractor illustrating conventional turning.

In the instant invention, the conventional steering rod is eliminated and replaced by a means soon to be described which permits the driver to place the front wheels in the normal steering positions shown in FIGS. 2 and 3 and in the zero radius turning positions shown in FIG. 1. Regarding the latter position since the axle must be made somewhat longer to permit attainment of this "pigeon-toed" position, if a relativley light axle is used a means is provided to relieve the additional strain placed on the axle which is conventionally clamped as at 50 to transversely spaced longitudinally extending leaf springs 52 whose ends are suspended in hangers 54 carried by the longitudinal chassis members 12. The means to relieve the additional strain consists of lugs 56 which extend laterally from the longitudinal members 12 and are disposed above the front axle 38. A coil spring 58 is interposed between each lug 56 and the top of the axle (the latter being preferably in the form of an I member) so that, in effect, two additional springs are interposed between the front axle and the chassis outboard thereof.

A pair of transversely extending rods 60 and 62 are provided whose outer ends are pivoted as at 64 and 66 to the ends of the links 48 around vertical axes. The inner ends of the rods extend slidably through outer ends of hydraulic cylinders 68 and 70 and are equipped with pistons 72 and 74. These cylinders are preferably of type designed to lock and unlock repeatedly and internally such as Tog-Loc made by Lionel-Pacific, Inc., of Los Angeles, Calif. The inner ends of the cylinders carry transversely extending lugs 76 and 78 which are pivoted about a common vertical pin 80 carried at the rear end of a longitudinally extending pitman arm 82. The other or forward end of the arm is pivoted for movement around a vertical axis as at 84 to a lug 86 extending from the axle 38.

Another transversely extending hydraulic cylinder 88 is pivoted at its outer end around a vertical axis 90 to the chassis member 12 or the lug 56. Through the inner end of the cylinder 88 a piston rod 92 extends slidably, the rod including a piston 94 at its inner end. The outer end of rod 92 is pivoted around a vertical axis as at 96 to the arm 82 intermediate its ends.

A conventional hydraulic pump 98 is operatively connected to the tractor transmission 99, the pump being connected to inlet and outlet lines 100 and 102 which are in turn connected by branch lines 104 and 106 to a conventional hydraulic power steering unit 108, such as the Orbitrol unit made by Char-Lynn, of Minneapolis, Minn. The unit 108 is in turn connected to cylinder 88 by lines 110 and 112.

A pair of lines 116 and 118 are connected to the main pump lines 100 and 102. Line 116 is divided into two flexible branches, one 120 which connects to the outer end of cylinder 70 and the other 122 which connects to the outer end of the other cylinder 68. Similarly, line 118 is divided into two flexible branches, one 124 which connects to the inner end of cylinder 70, and the other 126 which connects to the inner end of cylinder 68. A conventional four port, two position valve 128 is interposed in the lines 116 and 118. When the valve is in one position as shown in FIGS. 2 and 3, no fluid flows to the cylinders 68 and 70 so that normal steering can be effected. Thus, when the steering wheel 114 is turned in one direction, fluid will flow from the power steering unit 112 into the cylinder 88 and return via the line 110. In so doing the piston rod 92 will move to the left, as seen in FIG. 3, causing the arm 82 to pivot in the same direction and the cylinders 68 and 70 with their associated rods 60 and 62 and links 48 to move in the same direction and thereby turn the front wheels 16 and 18 in unison and substantial parallelism for effecting a left turn. The action is, of course, reverse for a right turn. The position of the moving parts in the straight ahead position of the wheels is shown in FIG. 2.

To urge the front wheels into the divergent positions shown in FIG. 1, the valve 128 is turned to its other position, thereby effecting fluid flow between the pump 98 and the cylinders 68 and 70. Fluid flows through line 118 and branch lines 124 and 126 and returns through branch lines 120 and 122 and line 116. In so doing the rods 60 and 62 are pushed outwardly while the reactive force causes the lugs 76 and 78 to pivot rearwardly around pin 80 as seen in FIG. 1. The ultimate position of the front wheels 16 and 18 is attained when the piston heads 72 and 74 coact with the ends of the cylinders 68 and 70 as stops. To effect this operation smoothly it is preferable that the operator start with the wheels in the straight away position of FIG. 2. When the operator wants to discontinue the zero radius turning operation and return to normal steering, he turns the valve 128 back to the position of FIGS. 2 and 3, whereupon fluid now flows from the pump in line 116 through branches 124 and 126 and returns via branches 124 and 126 and line 118. This retracts the rods 60 and 62 inwardly of the tractor.

As stated earlier, the mere turning of the front wheels 16 and 18 in the "pigeon-toed" position of FIG. 1 is not enough. To effect turning about the axis 24 in a zero radius, a means must be used to rotate the rear wheels 20 and 22 in opposite directions while the "pigeon-toed" position of the front wheels is retained. Three different means are illustrated in FIGS. 1, 4 and 5, 6.

Coming first to FIG. 1, this means comprises an hydraulic motor 130, such as the Orbit motor made by Char-Lynn, of Minneapolis, Minn., Patent No. Re. 25,291, which is mounted on the tractor chassis and is operatively connected via lines 132 and 134 to lines 100 and 102, there being a rotary 3 position, 4 port control or steering valve 136 interposed in the 100, 132 and 102, 134 lines. The shaft of the motor 130 is operatively connected to reduction gearing 138 and in turn to a sprocket 140.

The rear wheels are mounted on a simple inexpensive axle 142 in a conventional manner, the axle 142 mounting large sprockets 144 and 146 outboard of the chassis. The drive or propeller shaft 148 of the tractor motor is operatively connected to the differential 150 which is in turn operatively connected to a short axle 152 on the ends of which are mounted sprockets 154 which are in turn connected to the rear axle sprockets 144 and 146 via endless chains 156. On one end of the axle 152 is another sprocket 158 which is connected to the hydraulic motor sprocket 140 via another endless chain 160.

Thus, after the front wheels 16 and 18 are turned to the zero radius position, the valve 136 is actuated so that fluid from the pump 98 enters line 132 and returns in line 134 thereby supplying power to the motor 130. This causes the rear wheel 20 which is connected to the hydraulic motor to turn. If, however, the parking brake 162 is applied to propeller shaft 148 at the same time, the rear wheels 20 and 22 are caused to rotate in opposite directions as indicated by arrows 32 and 34. In so doing, the tractor turns about the axis 24 with the rear wheel 22 moving in the path of arrow 164 and the other rear wheel 20 moving in the path or arrow 166 with the front wheels 16 and 18 moving in a circular path around axis 24 as the center to effect zero radius turning. If the parking brake is not used to lock the propeller shaft, the tractor will turn about an axis located directly over the other wheel 22, which is stationary. The handle associated with the valve 136 can thus be used for steering purposes. It will be understood that the valve 136 is such as to permit the motor 130 to reverse its direction should the operator desire to effect rotation of the tractor in an opposite direction.

Figure 4:
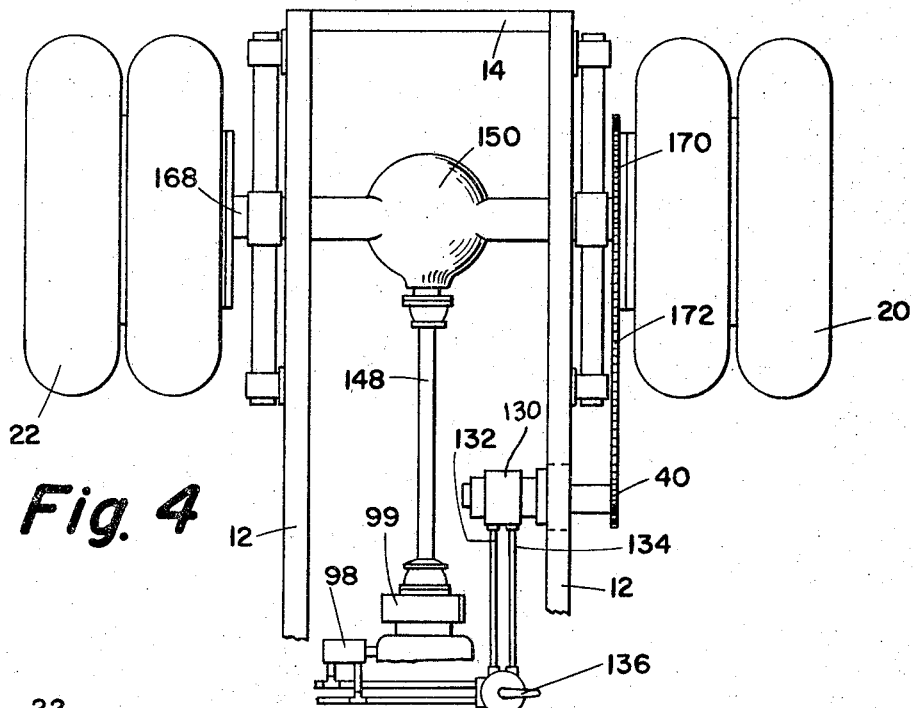
FIG. 4 is a top plan view of the rear end of the tractor ilustrating a modified means of driving the rear wheels reversely to each other.

The modification shown in FIG. 4 differs from that in FIG. 1 only in that it employs a conventional expensive rear axle 168 which is operatively connected to the differential 150 and does not employ any additional axle assembly. Thus, on one end of the rear axle a sprocket 170 is mounted which is connected by an endless chain 172 to the sprocket 140 associated with the motor 130, so that actuation of the valve 136 and application of the parking brake 162 as described above will cause the rear wheels to rotate reversely to each other.

Figure 5:
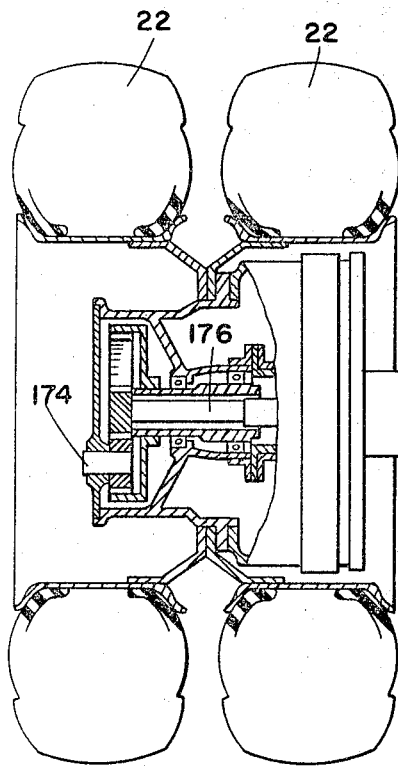
FIG. 5 is an enlarged fragmentary elevational view with parts broken away and others shown in phantom, of the rear end of a tractor illustrating yet another modified means of driving the rear wheels reversely to each other.
Figure 6:
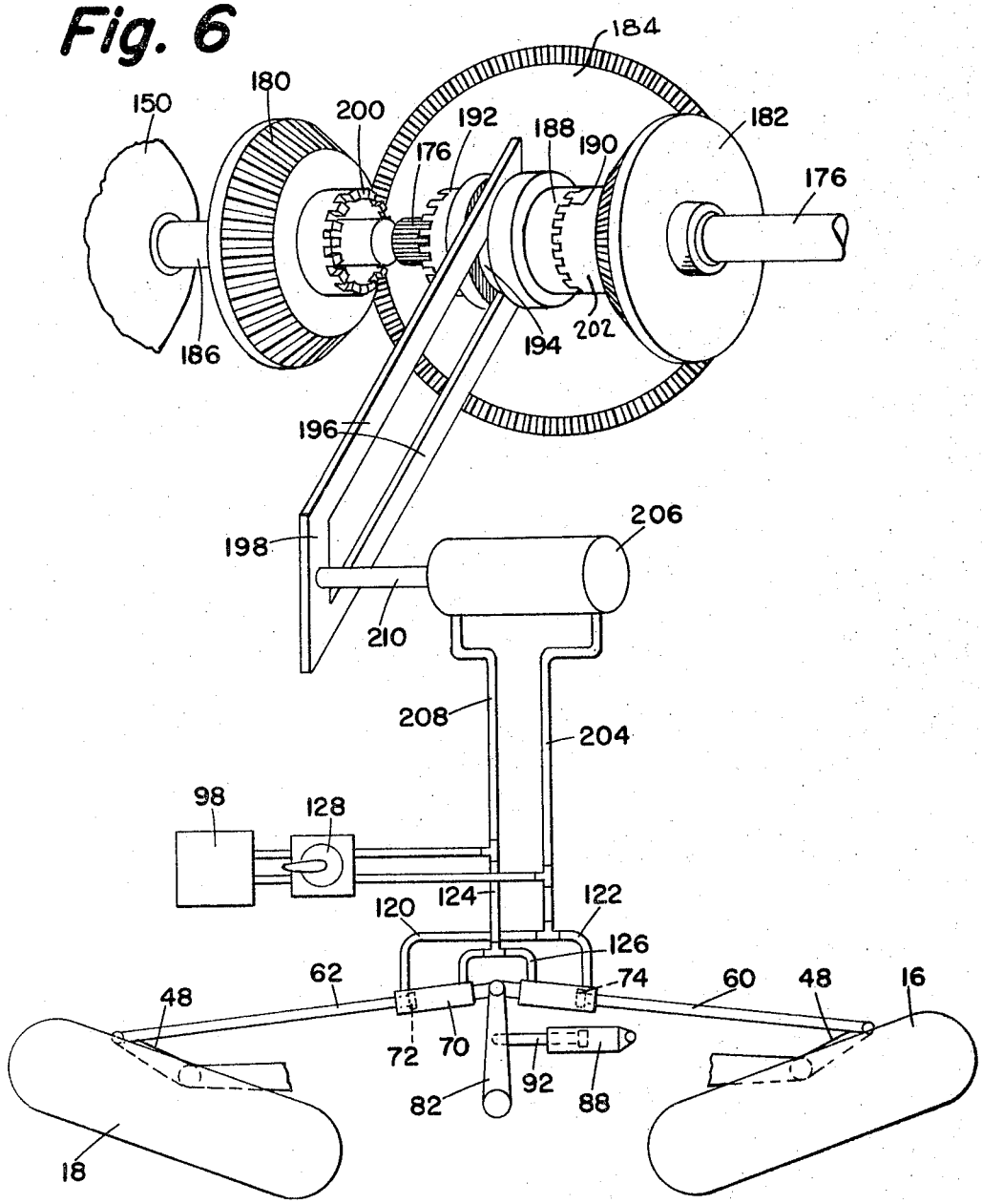
FIG. 6 is a diagrammatic view of the system using the modification of FIG. 5 with a group perspective view of a detail of the modified means.

The rear wheel reversing mechanism of FIGS. 5 and 6 is more complex and represents a means to effect the same via the differential without using sprockets and chains. One of the rear wheels 22 is equipped with a conventional 3:1 planetary gear 174 which is operatively connected to the axle 176. Interposed between the axle 176 and the standard differential 150 is a gear box 178 with a reversing gear mechanism therein.

This mechanism comprises a pair of spaced parallel bevel gears 180 and 182 rotatable in planes perpendicular to the axle and a further intermediate bevel gear 184 rotatable in a plane perpendicular to those of the bevel gears 180 and 182. The gear 180 is keyed to the stub shaft 186 of the differential 150 whereas the gear 182 is free to rotate on the axle 176.

Splined on the axle 176 for movement axially but non-rotatably thereof is a clutch member 188 having teeth 190 and 192 which extend in opposite axial directions and a circumferential groove 194 in which is received the legs 196 of a yoke member 198. The gear 180 includes a toothed member 200 complementary to and adapted to receive the teeth 192 of the clutch and the gear 182 has a similar toothed member 202 adapted to receive the other teeth 190 of the clutch.

In the operation of this modification, when the operator actuates the valve 128 in the cab to the position shown in FIGS. 2 and 3 for normal steering, fluid will flow in line 204 which is connected to one end of an hydraulic cylinder 206 mounted adjacent the gear box 178 and returns in line 208 which is connected to the other end of cylinder 206. In so doing, the fluid urges a piston rod 210 in one direction to the left of FIG. 6. The rod is connected to the yoke member 98 which is therefore also urged in this direction with the result that the clutch teeth 192 engage the toothed member 200 thereby effecting a direct connection between the differential shaft 186 and the rear axle 176. Thus, the rear axle and differential shaft rotate in unison in the same direction as do the rear wheels for normal driving. However, when the valve 128 is turned to the opposite direction to urge the front wheels into the divergent position of FIG. 1 for zero radius turning, fluid will flow in line 208 and return in line 204 retracting the piston rod 210 and pulling the clutch to the right until the teeth 190 engage the toothed member 202 of the gear 182. When this occurs the bevel gear 180 rotates about its axis in one direction, as shown by the arrow in FIG. 6, the bevel gear 184 rotates in the direction of the arrow there shown and the bevel gear 182 also rotates about the axis of the rear axle in the direction of the arrow there shown. The rotation of the second gear 182 is transmitted to the rear axle 176 via the clutch member 188 which rotates with the gear 182 and axle 176 within the legs 196 of the yoke member. In so doing one rear wheel 20 drops in one direction and the other wheel 22 in an opposite direction to effect turning of the vehicle about the axis 24 at a zero radius as previously described.

While preferred embodiments have here been shown and described, it will be understood that skilled artisans may make variations without departing from the spirit of the invention and scope of the appended claims.

I claim:

1. A vehicle having an elongated chassis, front and rear axles, wheels mounted on the rear axle for rotation about the axis thereof, wheels mounted on the front axle for rotation about the axis thereof and for movement about vertically extending axes, and means to move the front wheels about said vertically extending axes into positions diverging outwardly of the chassis whereby the vehicle may be turned about the intersection of the longitudinal axis of the chassis and that of the rear axle to provide a zero turning radius, said means including an hydraulic pump, a pair of cylinders operatively connected to each other and to said pump, piston rods slidable in said cylinders having inner ends disposed in said cylinders and outer ends pivotally attached to the front wheels, and a valve to admit fluid into said cylinders selectively to one side and the other of the inner ends of said piston rods to thereby selectively extend said piston rods and cause the front wheels to move about said vertically extending axes to divergent positions and retract said piston rods and cause the front wheels to return to their original positions, means to move the front wheels about said vertically extending axes into positions of substantial parallelism, and means to steer the front wheels while in said positions of substantial parallelism including a power steering unit, a second hydraulic cylinder mounted on said chassis having a second piston rod slidable therein, and means pivotally connecting said second piston rod to said first-named cylinders, said power steering unit being operatively connected to said pump and said second cylinder so that when said valve is turned to a position to cause retraction of said first-named piston rods, operation of said power steering unit will move said second piston rod and cause said first-named cylinders and said first-named piston rods to move laterally as a unit and thereby turn the front wheels in parallelism.

2. A vehicle having a longitudinal chassis, front and rear transverse axles, wheels mounted on the rear axle for rotation about the axis thereof, power means to drive said rear wheels, wheels mounted on the front axle for rotation about the axis thereof and for movement about vertically extending axes, hydraulic means to move the front wheels into divergent positions upon a common circle whose center is the intersection of said longitudinal axis of the chassis and that of the rear axle, means to cause rotation of the rear wheels reversely to each other so that the front wheels will move in said common circle to provide a zero turning radius for the vehicle, and means to move the front wheels about said vertically extending axes into positions of substantial parallelism for normal steering, said means to move the front wheels into said divergent positions including a pair of hydraulic cylinders, common means pivotally securing said cylinders to each other, piston rods slidable in said cylinders and pivotally secured to said front wheels, and means to admit fluid into said cylinders simultaneously on the sides of the pistons adjacent to or remote from said common pivot means for selective extension and retraction of said piston rods.

3. The combination of claim 2 wherein said common means pivotally securing said cylinders to each other is further pivoted to said vehicle to provide lateral movement of said cylinders relative to said chassis.

4. The combination of claim 3 and means to steer the front wheels while in said positions of substantial parallelism, said means including a steering unit operatively connected to said means pivotally connecting said cylinders to eeach other and to said vehicle.

5. A vehicle having a longitudinal chassis, front and rear transverse axles, wheels mounted on the rear axle for rotation about the axis thereof, power means to drive said rear wheels, wheels mounted on the front axle for rotation about the axis thereof and for movement about vertically extending axes, hydraulic means to move the front wheels into divergent positions upon a common circle whose center is the intersection of said longitudinal axis of the chassis and that of the rear axle, means to cause rotation of the rear wheels reversely to each other so that the front wheels will move in said common circle to provide a zero turning radius for the vehicle, and means to move the front wheels about said vertically extending axes into positions of substantial parallelism for normal steering, said means to move the front wheels into said divergent positions including a pair of hydraulic cylinders, means pivotally securing said cylinders to each other including an arm pivoted to said vehicle, piston rods slidable in said cylinders and pivotally secured to said front wheels, means to admit fluid into said cylinders simultaneously on the sides of the pistons adjacent to or remote from said pivot means for selective extension and retraction of said piston rods, and means to steer the front wheels while in said positions of substantial parallelism including a steering unit operatively connected to said arm.

6. The combination of claim 5 wherein said means to cause rotation of the rear wheels reversely to each other includes a differential having a stub shaft and a first bevel gear secured thereto, a second bevel gear mounted for free rotation on said rear axle, an intermediate bevel gear interconnecting said first and second bevel gears, a clutch movable axially but non-rotatably on said rear axle between said first and second bevel gears and means to selectively shift said clutch into engagement with said first bevel gear and thereby cause the rear wheels to rotate in the same direction and into engagement with said second bevel gear and thereby cause reverse rotation of the rear wheels.

7. The combination of claim 6 wherein said means to selectively shift said clutch includes a further hydraulic cylinder operatively connected to said first-named cylinders and a piston rod slidable in said further cylinder and connected to said clutch whereby when said piston rods in said first-named cylinders are retracted said clutch shifts to engage said first bevel gear, and when said piston rods in said first-named cylinder are extended said clutch shifts to engage said second bevel gear.

8. The combination of claim 5 wherein said means to cause rotation of the rear wheels reversely to each other includes a hydraulic motor mounted on said chassis, said means to move the front wheels into said divergent positions including a pump, means operatively connecting said hydraulic motor to said pump including a valve, a differential having an axle driven by said hydraulic motor, means operatively connecting said differential axle to said rear axle, said rear wheel drive means including a propeller shaft operatively connected to said differential, and a brake for said propeller shaft whereby when said valve is actuated and said brake is applied to restrain said propeller shaft the rear wheels will turn in reverse directions to each other.

9. The combination of claim 5 including longitudinal springs flexibly mounting the front wheels on the chassis, lugs extending laterally from the chassis above the front axle and additional spring means interposed between the front axle and the lugs.

References Cited by the Examiner
UNITED STATES PATENTS

| | | | |
|---|---|---|---|
| 1,632,665 | 6/1927 | Mitchell | 180—6.24 X |
| 2,863,518 | 12/1958 | Pellizzetti | 180—79.2 |
| 2,915,319 | 12/1959 | Kumler et al. | 180—91 |
| 3,154,162 | 10/1964 | McCaleb et al. | 180—6.66 |

BENJAMIN HERSH, *Primary Examiner.*

J. H. BRANNEN, *Assistant Examiner.*